United States Patent
Voks et al.

(10) Patent No.: US 10,642,775 B1
(45) Date of Patent: May 5, 2020

(54) SIZE REDUCTION OF COMPLETION NOTIFICATIONS

(71) Applicant: MELLANOX TECHNOLOGIES, LTD., Yokneam (IL)

(72) Inventors: Igor Voks, Tel Aviv (IL); Dror Bohrer, Nesher (IL); Lior Narkis, Petah-Tikva (IL); Ariel Shahar, Jerusalem (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/458,073

(22) Filed: Jun. 30, 2019

(51) Int. Cl.
| G06F 3/00 | (2006.01) |
|---|---|
| G06F 13/42 | (2006.01) |
| G06F 13/40 | (2006.01) |
| G06F 13/16 | (2006.01) |

(52) U.S. Cl.
CPC ........ *G06F 13/423* (2013.01); *G06F 13/1673* (2013.01); *G06F 13/4059* (2013.01); *G06F 2213/0024* (2013.01)

(58) Field of Classification Search
CPC .... G06F 13/00; G06F 13/423; G06F 13/1673; G06F 13/4059
USPC ...................... 710/305–306, 316–317, 35, 19
See application file for complete search history.

(56) References Cited

U.S. PATENT DOCUMENTS

| 5,671,365 A | 9/1997 | Binford et al. |
|---|---|---|
| 5,875,343 A | 2/1999 | Binford et al. |
| 6,085,227 A | 7/2000 | Edlund et al. |
| 6,718,370 B1 | 4/2004 | Coffman et al. |
| 7,152,122 B2 | 12/2006 | Kagan et al. |
| 7,404,190 B2 | 7/2008 | Krause et al. |
| 7,761,619 B2 | 7/2010 | Feng et al. |
| 8,291,135 B2 | 10/2012 | Subramanian et al. |
| 8,924,605 B2 | 12/2014 | Hayut et al. |
| 8,959,265 B2 * | 2/2015 | Hayut ............... G06F 3/016 710/19 |
| 9,871,734 B2 | 1/2018 | Kagan et al. |
| 2003/0065856 A1 * | 4/2003 | Kagan ............. G06F 13/387 710/263 |
| 2007/0033285 A1 * | 2/2007 | Shiigi ............. G06Q 20/06 709/227 |

(Continued)

OTHER PUBLICATIONS

Patel et al, "A Model of Completion Queue Mechanisms using the Virtual Interface API", Proceedings of IEEE International Conference on Cluster Computing, pp. 280-288, Nov. 28-Dec. 1, 2000.

(Continued)

*Primary Examiner* — Tim T Vo
*Assistant Examiner* — Kim T Huynh
(74) *Attorney, Agent, or Firm* — Kligler & Associates Patent Attorneys Ltd

(57) ABSTRACT

A computer peripheral device includes a host interface, which is configured to communicate over a bus with a host processor and with a system memory of the host processor. Processing circuitry in the peripheral device is configured to receive and execute work items submitted to the peripheral device by client processes running on the host processor, and responsively to completing execution of the work items, to write completion reports to the system memory, including first completion reports of a first data size and second completion reports of a second data size, which is smaller than the first data size.

14 Claims, 8 Drawing Sheets

(56) References Cited

U.S. PATENT DOCUMENTS

| | | |
|---|---|---|
| 2008/0091868 A1 | 4/2008 | Mizrachi et al. |
| 2008/0155154 A1 | 6/2008 | Kenan et al. |
| 2011/0010557 A1* | 1/2011 | Kagan .................. H04L 9/3247 713/180 |
| 2013/0054858 A1 | 2/2013 | Bugge |
| 2013/0124929 A1 | 5/2013 | Harada et al. |
| 2013/0311488 A1* | 11/2013 | Erdogan ............. G06F 16/2322 707/752 |
| 2014/0143454 A1* | 5/2014 | Hayut .................... G06F 3/016 710/19 |

OTHER PUBLICATIONS

InfiniBandTM Architecture Specification, vol. 1, Release 1.2.1, relevant pp. 445-449, Nov. 2007.

Mellanox Adapters Programmer's Reference Manual (PRM) Supporting ConnectX®-4 and ConnectX®-4 Lx Revision 0.40, relevant pp. 115-132, year 2016.

ARM® AMBA® 5 CHI Architecture Specification, Cambridge, England, relevant pp. 223-230 (Chapter 7), year 2017.

\* cited by examiner

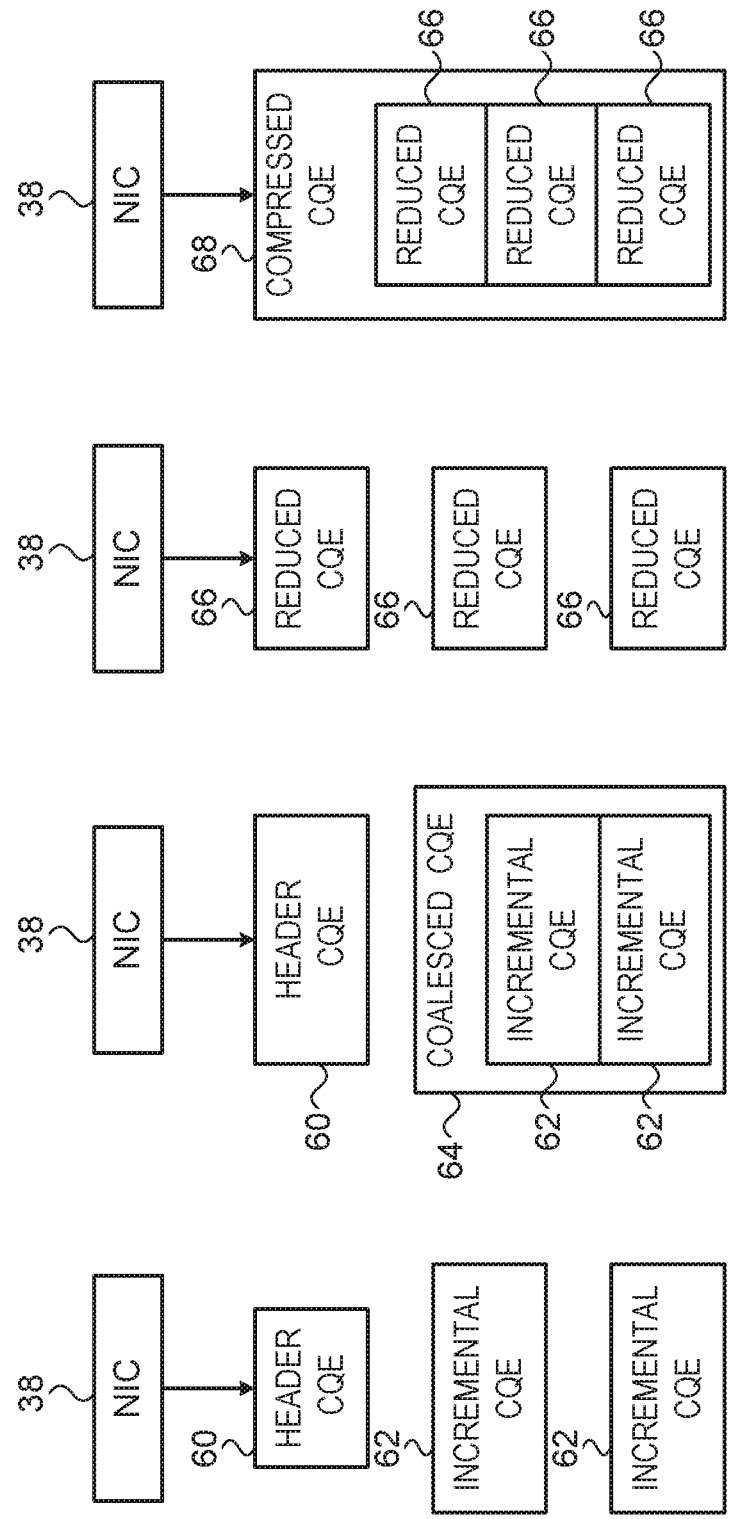

FIG. 9

SIZE REDUCTION OF COMPLETION NOTIFICATIONS

FIELD OF THE INVENTION

The present invention relates generally to computer systems, and particularly to input/output (I/O) devices and their interaction with host computing devices.

BACKGROUND OF THE INVENTION

Switched-fabric communication networks such as InfiniBand™ and high-speed Ethernet™ may use Completion Queues (CQs) to signal to a requestor ("client") that network tasks have been completed. Completion Queues in InfiniBand are described, for example, in InfiniBand™ Architecture Specification, Volume 1, Release 1.2.1 Nov. 2007, pages 445 to 449; and, in Mellanox Adapters Programmer's Reference Manual (PRM), Revision 040 (2016), pages 115-132.

Techniques for reducing the size of CQs are described, for example, in U.S. Pat. No. 8,959,265, which is incorporated herein by reference.

SUMMARY OF THE INVENTION

An embodiment of the present invention that is described herein provides a computer peripheral device including a host interface and processing circuitry. The host interface is configured to communicate over a bus with a host processor and with a system memory of the host processor. The processing circuitry is configured to receive and execute work items submitted to the peripheral device by client processes running on the host processor, and, responsively to completing execution of the work items, to generate to the system memory completion reports having fields, including: identifying in a plurality of the completion reports one or more fields whose corresponding values are identical; and sending to the system memory a full completion report that comprises the identified fields, and, after sending the full completion report, sending to the system memory reduced completion reports from which the identified fields are omitted.

In an embodiment, the processing circuitry is configured to mark the full completion report with an indication that distinguishes between the full completion report and the reduced completion reports. In another embodiment, the processing circuitry is configured to mark the reduced completion reports with indications that distinguish between the full completion report and the reduced completion reports. In yet another embodiment, the processing circuitry is configured to identify, in the plurality of the completion reports, first and second different sets of the values, to create respective first and second full reports that comprise the first and second sets of the values, and to concurrently accumulate first reduced completion reports for sending with the first full completion report, and second reduced completion reports for sending with the second full completion report.

There is additionally provided, in accordance with an embodiment of the present invention, a computer peripheral device including a host interface and processing circuitry. The host interface is configured to communicate over a bus with a host processor and with a system memory of the host processor. The processing circuitry is configured to receive and execute work items submitted to the peripheral device by client processes running on the host processor, and responsively to completing execution of the work items, to generate to the system memory completion reports having fields, including: accumulating the completion reports for sending to the system memory over the bus in a common bus transaction; and stopping accumulation of the completion reports and initiating the common bus transaction in response to (i) a number of the accumulated completion reports reaching a predefined number, or (ii) a preset elapsed-time timer reaches a predefined time-out.

In an embodiment, the elapsed-time timer is initiated on accumulation of a completion report into the common bus transaction. In another embodiment, the elapsed-time timer is initiated on sending of a completion report to the system memory. In yet another embodiment, the elapsed-time timer includes first and second elapsed-time timers operating concurrently, the first elapsed-time timer is initiated on accumulation of a completion report into the common bus transaction, and the second elapsed-time timer is initiated on sending of a completion report to the system memory.

There is also provided, in accordance with an embodiment of the present invention, a computer peripheral device including a host interface and processing circuitry. The host interface is configured to communicate over a bus with a host processor and with a system memory of the host processor. The processing circuitry is configured to receive and execute work items submitted to the peripheral device by client processes running on the host processor, and responsively to completing execution of the work items, to generate to the system memory completion reports having fields, including: reducing sizes of at least some of the completion reports from full sizes to a reduced sizes, respectively; writing the completion reports having the reduced sizes to the system memory in a cyclic buffer that is overwritten in successive iterations, but assigning in the cyclic buffer the full sizes to the completion reports, thereby retaining in the cyclic buffer one or more completion reports belonging to a previous iteration; and marking the written completion reports with marks that distinguish between a present iteration and the previous iteration.

In an embodiment, the marks differ in value between the present iteration and the previous iteration. In another embodiment, the marks differ in storage location between the present iteration and the previous iteration.

There is further provided, in accordance with an embodiment of the present invention, a method including in a computer peripheral device, communicating over a bus with a host processor and with a system memory of the host processor. Work items, submitted to the peripheral device by client processes running on the host processor, are received and executed. Responsively to completing execution of the work items, completion reports having fields are generated to the system memory, including: identifying in a plurality of the completion reports one or more fields whose corresponding values are identical; and sending to the system memory a full completion report that comprises the identified fields, and, after sending the full completion report, sending to the system memory reduced completion reports from which the identified fields are omitted.

There is also provided, in accordance with an embodiment of the present invention, a method including in a computer peripheral device, communicating over a bus with a host processor and with a system memory of the host processor. Work items, submitted to the peripheral device by client processes running on the host processor, are received and executed. Responsively to completing execution of the work items, completion reports having fields are generated to the system memory, including: accumulating the completion reports for sending to the system memory over the bus in a common bus transaction; and stopping accumulation of the completion reports and initiating the common bus transaction in response to (i) a number of the accumulated completion reports reaching a predefined number, or (ii) a preset elapsed-time timer reaches a predefined time-out.

There is additionally provided, in accordance with an embodiment of the present invention, a method including in a computer peripheral device, communicating over a bus with a host processor and with a system memory of the host processor. Work items, submitted to the peripheral device by client processes running on the host processor, are received and executed. Responsively to completing execution of the work items, completion reports having fields are generated to the system memory, including: reducing sizes of at least some of the completion reports from full sizes to a reduced sizes, respectively; writing the completion reports having the reduced sizes to the system memory in a cyclic buffer that is overwritten in successive iterations, but assigning in the cyclic buffer the full sizes to the completion reports, thereby retaining in the cyclic buffer one or more completion reports belonging to a previous iteration; and marking the written completion reports with marks that distinguish between a present iteration and the previous iteration.

The present invention will be more fully understood from the following detailed description of the embodiments thereof, taken together with the drawings in which:

BRIEF DESCRIPTION OF THE DRAWINGS

FIGS. 2A-2D are block diagrams that schematically illustrate the generation of sequences of Completion Queue Entries (CQEs), in accordance with an embodiment of the present invention;

FIG. 9 is a table that schematically illustrates the placement of validity indicators in a completion queue, in accordance with an embodiment of the present invention.

DETAILED DESCRIPTION OF EMBODIMENTS

Overview

Figure 1:
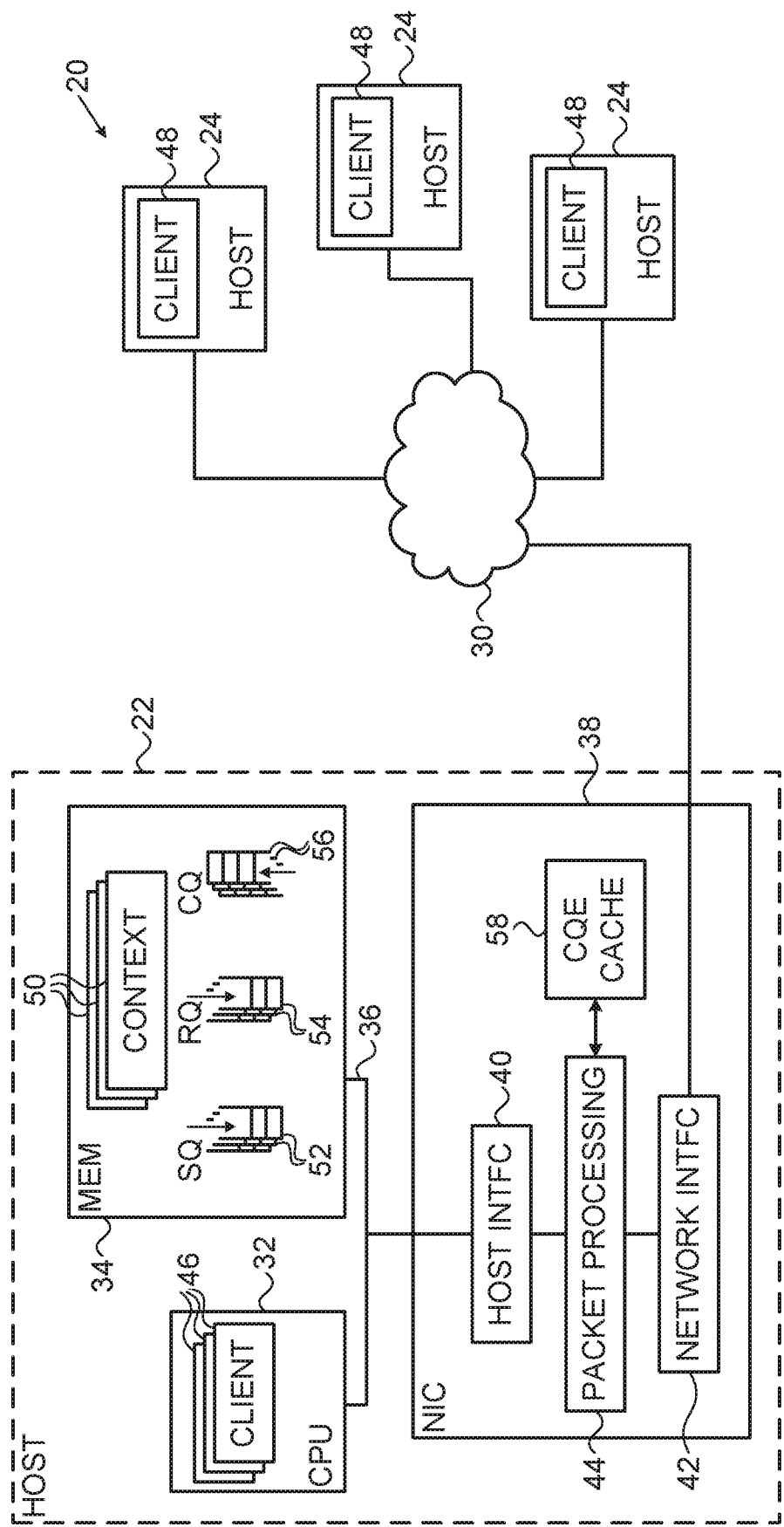
FIG. 1 is a block diagram that schematically illustrates a computer system, in accordance with an embodiment of the present invention.

Switched-fabric communication architectures are widely used in high-performance computing. Aspects of these architectures will be described here by way of illustration (and implementation of an embodiment of the present invention in the Ethernet environment will be described below in the Detailed Description), but it should in no way be understood that the present invention is limited to one particular type of switched fabric or another.

According to embodiments of the present invention, Computing devices (host processors and peripherals) connect to the switched fabric via a network interface controller (NIC), which is referred to in InfiniBand (IB) parlance as a channel adapter. Host processors (or hosts) use a host channel adapter (HCA), while peripheral devices use a target channel adapter (TCA).

In embodiments, client processes (referred to hereinafter as clients), such as software application processes, running on a host processor communicate with the transport layer of the fabric by manipulating a transport service instance, referred to hereinbelow as a "queue pair" (QP), which is made up of a send work queue and a receive work queue. According to some embodiments, to send and receive messages over the network using a HCA, the client submits work items, called work queue elements (WQEs), for execution by the HCA. (More precisely, the client initiates work requests (WRs), which cause WQEs to be placed in the appropriate work queues.)

In some embodiments, after it has finished servicing a WQE, the HCA writes a completion report, in the form of a completion queue element (CQE), to a completion queue, to be read by the client as an indication that the work request has been executed.

Although the above terminology and some of the embodiments in the description that follows are based on features of the IB architecture and use vocabulary taken from IB specifications, similar mechanisms exist in networks and I/O devices that operate in accordance with other protocols, such as Ethernet and Fibre Channel. The IB terminology and features are used herein by way of example, for the sake of convenience and clarity, and not by way of limitation.

In some embodiments according to the present invention, transmission of completion reports from a peripheral device to host memory can consume considerable bandwidth on the host bus and data volume in the memory. For example, in embodiments wherein completion reports are transmitted over a peripheral component bus, delivery of each report requires execution of a bus transaction, even if the amount of data in each such report is small. Taking a NIC as an example of a peripheral device, and CQEs as examples of completion reports, when the NIC exchanges large amounts of data with many different nodes in a network, each such exchange may entail delivery of a CQE to the host memory. In embodiments, the large number of CQEs to be delivered results in an equally large number of bus transactions, which can cause a bottleneck in system performance.

According to some embodiments of the present invention, the network processor may eliminate non-essential information from at least some of the completion reports that are transmitted by a peripheral device. In particular, when a sequence of completion reports is transmitted to a given completion queue, repeated information, which is common to all of the reports in the sequence, may be eliminated, thereby reducing the data volume per report. When appropriate, multiple completion reports of reduced size may be transmitted at once, in a single bus transaction, in order to reduce the number of bus transactions that are entailed.

In a disclosed embodiment, a peripheral device comprises a host interface, which communicates over a bus with a host processor and with a system memory of the host processor. Processing circuitry in the peripheral device receives and executes work items, which are submitted to the peripheral device by client processes running on the host processor, and then writes completion reports to the system memory. The completion reports may be of different sizes: When necessary, the peripheral device sends a full complement of all completion information that will be required by the client process to identify the work item that was completed. When possible, however, the peripheral device may send completion reports of a smaller data size, from which superfluous information has been eliminated. Typically, these smaller completion reports rely on the client process to draw any needed additional information from a previous completion report in the same completion queue or from other sources, such as application memory or the context of the completion queue itself.

Additionally or alternatively, in order to reduce the number of bus transactions (and thus reduce bus transmission overhead and conserve bus bandwidth), the peripheral device may in some cases delay the transmission of completion reports that it has generated, and then may write multiple completion reports to the system memory together in a single bus transaction. This sort of collection of completion reports in a single transaction is useful particularly (although not exclusively) when the data size of each completion report is smaller than the minimum transaction size of the bus. Such a situation may arise, for example, when the data sizes of the completion reports are reduced as described above.

The process of reducing the size of completion reports, and the joining of several reduced size reports, will be referred to below as "coalescing," and the joined group of reduced completion reports a "coalesced completion report."

According to some embodiments of the present invention, groups of coalesced completion reports may comprise reduced representations of a shared non-reduced completion report. For example, if each completion report comprise 16 fields, and, if, in any one of a group of completion reports, 14 of the fields are identical to the corresponding fields of a shared completion report, the peripheral device may send, for each completion report, only the two fields that are unique. In addition, the peripheral device will send a shared non-reduced completion report that comprises a single copy of all the fields from which the reduced completion reports were derived. The client will then be able to reconstruct the full completion reports from the reduced completion reports and the single copy of all fields.

The shared non-reduced completion report is referred to hereinbelow as "Title," (and, sometimes, as "header"), and the reduced completion reports are referred to as "Mini-Completion-Queue-Entries" (Mini-CQEs.) Each Title is typically followed by a group of Mini-CQEs that are associated (e.g.—have shared fields) with the Title.

In embodiments according to the present invention, groups of Mini-CQEs are coalesced and typically sent in a single bus transaction. Such group of coalesced Mini-CQEs will be referred to hereinbelow as Mini-CQE-Group (MCG). The time in which the peripheral device sends MCGs that refer to the same Title is referred to hereinbelow as "Coalescing Session". In embodiments according to the present invention, a Coalescing Session may terminate if, for example, the current Title no longer fits with the current completion reports (e.g.—when a new flow of communication packets starts).

Title-First

In an embodiment, the Title may specify the number of MCGs associated with the Title. In this case, the peripheral device will be able to send The Title only after the device sends all associated MCGs, and the number of MCGs is known. The drawback of this approach, however, is increased latency time, as the client delays the completion of network operations pertaining to Mini-CQEs until the client reads the Title.

In embodiments according to the present invention, the order is changed, and increased latency time is avoided. Prior to sending Mini-CQEs, the peripheral device sends a Title, which comprises at least a first non-reduced CQE. The Title is then used as a template for reducing further CQEs. As the number of MCGs that are associated with each Title is not sent, an additional field may be added to the Title, to indicate that it is a Title rather than an MCG. Alternatively or additionally, a field may be added to each MCG, indicating that it is an MCG rather than a title.

Timers

When one or more Mini-CQEs are waiting to be coalesced and sent to the client, processing of the Mini-CQEs is deferred until the MCG is written. Consequently, if the next CQE is delayed, latency time for the pending Mini-CQEs may be long.

One way to mitigate this problem is to implement in the peripheral device a time-out counter, which measures elapsed time, starting from the time the first Mini-CQE is ready. If a preset time threshold expires, the peripheral device will write an MCG that comprises all pending Mini-CQEs (although the MCG may be smaller than the bus width), and then start a new coalescing session with a new Title. By adjusting the value of the threshold, a programmer is able to define a tradeoff between latency time and throughput or bus efficiency (as explained above, bus transactions that do not utilize the full bus width may degrade such performance)—in applications wherein latency is more important, the threshold will be set to a lower value.

In the disclosed embodiments, two timers are defined and may be used, jointly or separately—an "Any-Write Timer" and a "MCG Timer."

The Any-Write timer is used to close Coalescing sessions having a slow stream of CQEs and allow a possibly better queue, for example if a new flow starts. The Timer starts counting when the peripheral device writes any completion report (Title or MCG). If a preset threshold expires, the peripheral device assembles all pending Mini-CQEs in an MCG (although more Min-CQEs may fit in the MCG, without exceeding the bus width), and writes the MCG. A new Coalescing Session will then start for subsequent CQEs.

The MCG timer limits the time that a Mini-CQE can wait until it is coalesced and written in an MCG. The timer starts counting when a new CQE is received. Like the case of the any-write timer, if a preset threshold expires, the peripheral device assembles all pending Mini-CQEs in an MCG and writes the MCG. The Coalescing Session, however, is not terminated. For example, if an MCG comprises up to 7 Mini-CQEs, a Mini-CQE that arrives will never wait for a period that is longer than 7 times the value of the MCG timer threshold.

Using the timers described above, a programmer can fine-tune the latency-performance tradeoffs, separately for completion reports of the same and of different flows.

Handling Empty Spaces in the CQ Buffer

According to embodiments of the present invention, the number of pending CQEs (e.g.—CQEs that the peripheral device has written in the buffer but the client has not yet read) is a design parameter that is useful to properly synchronize the peripheral device and the client. Hence, the peripheral device does not write consecutive MCGs (or an MCG and the next Title, if there are no more MCGs in the session) in sequential locations in the CQ. Instead, the peripheral device skips some locations after each write, so as to leave space for the coalesced Mini-CQEs that are not written. In other words, the locations into which the MCGs and Titles are written are the same locations into which the corresponding CQEs would have been written without coalescing. For example, if 8 CQEs are coalesced and written to location n in a CQ buffer, the next entry will be written to location n+8, leaving 7 empty spaces in the buffer.

In embodiments according to the present invention, the CQ buffer may be cyclic, and the same buffer locations are reused in successive iterations. When the client reads the completion queue, the client should be able to decide if the location that the client reads stores a new MCG (or Title), or an entry that has been written in the previous iteration.

One possible solution is—the peripheral device marks, in each CQ entry, if the entry pertains to an odd or an even iteration. In even iterations, the client will look for entries that are marked as pertaining to even iterations only; if the client reads an entry with an odd-iteration indication, the client will reread the entry until the indication changes.

However, as there are empty spaces in the CQ, entries that the client reads may comprise data from older iterations, with marking that is no longer valid This issue can be solved if the client, when reading the buffer, will mark all empty spaces, as pertaining to an odd or an even iteration (according to the marking of the entries in the last iteration). The solution, however, comes with a performance price, as the client has to write all empty spaces during each iteration.

In some embodiments according to the present invention, the peripheral device marks each entry with the iteration number indication (referred to as "Validity-Indicator") rather than a mere odd-even iteration indication. In a disclosed embodiment, the Validity-Indicator comprises 8 bits, and equals the sequential iteration number modulo 256. The client always checks if the iteration number indication matches the current iteration, and, if not, waits for the CQE to be replaced. Thus, the client has to clear the Validity-Indicators in all empty spaces once in every 256 iterations, significantly reducing the performance price.

Although we will refer hereinbelow to 8-bit validity indicators, the number of bits in a validity indicator according to embodiments of the present invention is by no means limited to 8.

In other embodiments of the present invention, the client never clears the Validity-Indicators. MCGs and Titles are written, with Validity-Indicators, in locations that change between iterations. For example, in a first iteration, MCGs and Titles may be written, with Validity-Indicator=0, to locations 0, 128, 256, etc. (according to this example embodiment, the spacing between the locations equals 128 if the Validity-Indicator is 8 bits (2^(number of Validity-indicator bits−1) in the general case). Then, in iteration 1, MCGs and Titles will be written with Validity-Indicator=1, to locations 1, 129, 257, etc. If n is the number of bits in the Validity-Indicator, and i is the iteration number, then, CQ entry C will be written into if and only if:

$$C \% (2^{(n-1)}) = i \% (2^{(n-1)})$$

The Validity-Indicator value will be $i \% (2^n)$.

Thus, the client will be able to identify if a CQ entry that the client reads pertains to the current iteration, or to a previous iteration, without ever having to reset the Validity-Indicators (with the possible exception of reset-time initialization).

Although the embodiments described hereinbelow relate, for the sake of convenience and clarity, to transmission of CQEs from a NIC to a host memory, the principles of the present invention may be applied to substantially any type of completion reports. Such reports may be generated and conveyed to the host processor by substantially any type of I/O device, such as a storage controller, as well as by other sorts of peripheral devices, such as a graphics processing unit (GPU), that may be required to report to a host processor on completion of assigned tasks. In this context, the term "peripheral device" may refer to any sort of execution unit other than the processing core or cores of the central processing unit (CPU) itself.

System Description

FIG. 1 is a block diagram that schematically illustrates a network communication system 20, in accordance with an embodiment of the present invention. A host computer 22 (also referred to as a host or a host device) communicates with other hosts 24 via a network 30, such as an IB or Ethernet switch fabric in the present example. Computer 22 comprises a central processing unit (CPU) 32 and a system memory 34 (also referred to as a host memory), which are connected by a suitable bus 36. A NIC 38, such as an HCA, connects computer 22 to network 30. NIC 38 is connected to the other components of computer 22 by bus 36, which may be a peripheral connection bus, such as a PCI Express™ (PCIe) bus, or it may be an internal system bus of CPU 32, depending on the architecture of the computer.

NIC 38 comprises a network interface 42, which is coupled to network 30, and a host interface 40, which connects to CPU 32 and memory 34 via bus 36. Packet processing circuitry 44, coupled between network interface 42 and host interface 40, generates outgoing packets for transmission over network 30 and processes incoming packets received from the network. Interfaces 40 and 42 and circuitry 44 typically comprise dedicated hardware logic, whose details will be apparent to those skilled in the art after reading the present description. Alternatively or additionally, at least some of the functions of circuitry 44 may be implemented in software on a suitable programmable processor.

Client processes (referred to simply as clients 46) running on CPU 32, such as processes generated by application software, communicate with clients 48 running on remote hosts 24 by means of QPs on NIC 38. Each client 46 may be assigned multiple QPs, for communication with different clients on various remote hosts. Context information regarding each QP is stored in a corresponding context 50. In the present embodiment, context 50 is stored in host memory 34; but context information may, additionally or alternatively, be stored in NIC 38 or in other dedicated memory. Each QP typically comprises a send queue (SQ) 52 and a receive queue (RQ) 54. As noted earlier, clients 46 submit work items, in the form of WQEs, for execution by NIC 38 by initiating work requests, which cause the WQEs to be written to the appropriate SQ 52 or RQ 54 by host software.

NIC 38 reads and executes the WQEs from SQ 52 and RQ 54, and accordingly transmits data from specified locations in memory 34 in outgoing packets over network 30, and writes data from incoming packets to the memory. Upon completion of a WQE, circuitry 44 typically writes a CQE to a completion queue (CQ) 56. Each CQ has its own context 50, which may be stored, like the QP context, in memory 34. Typically, each QP is assigned a corresponding CQ, and the CQ number for each QP is recorded in QP context 50. (Multiple QPs may share the same CQ.) In embodiments of the present invention, however, circuitry 44 may not write every CQE to memory as soon as it is generated, but, rather may collect at least some of the CQEs in a CQE cache 58 in NIC 38, and may then transmit the collected completion information together over bus 36 in a single bus transaction, as described further hereinbelow.

After writing a CQE to CQ 56, circuitry 44 may assert an interrupt to cause CPU 32 to read and process the CQE. Alternatively or additionally, the CPU may periodically poll CQs 56 for new CQEs. These aspects of CQE handling are described, for example, in U.S. Pat. No. 9,871,734, whose disclosure is incorporated herein by reference, but they are beyond the scope of the present disclosure.

To report all relevant completion information to client 46, a CQE may typically comprise as much as 64 or 128 bytes of information. (To avoid inefficient access to memory 34, it is also desirable that the transmitted data size be no smaller than the length of a single cache line of CPU 32, which is typically 64 or 128 bytes in current-generation devices.) For example, the following table lists data fields that may be used in CQEs that report transmission or reception of packets over an Ethernet network:

TABLE I

FULL ETHERNET CQE LISTING

| Field name | Description |
| --- | --- |
| UP | Ethernet user-priority (802.1p) taken from the VLAN header |
| CFI | Ethernet CFI bit, taken from the VLAN header |
| VLAN-ID | Ethernet VLAN-ID |
| IPv6/IPv4 Encap | Indicates L3 de-capsulation type |
| IPv6 Extension Mask/ IPv4 Options/ IPv4 Frags | Indicates packet fragmentation |
| TCP/UDP/ETACK | Indicates L4 header type |
| HDS TYPE | Indicates Header-Data split |
| L4 CSUM | TCP/UDP packet with IPOK set and correct L4 checksum |
| IPOK | IP headers are identified and L3 checksum is correct |
| VLAN | Indicates VLAN header type |
| Checksum | Computed over packet - 16 bits |
| FL | Packet received due to force loopback |
| L3 Header | indicates L3 header was written to memory |
| L3 Header Type | Indicates L3 header type |
| RSS Hash Result | 32 bit RSS/RCA hash function result |
| RSS Hash Type | Indicates whether RSS/RCA found a match according to one of the flags (non-zero) or did not find a match (zero). |
| SRQN | For shared receive queue (SRQ) responder-SRQ Number |
| LRO fields | Information relating to large receive offload packets |
| Byte Count | Byte count of data transferred (32 bits) |
| Time stamp | 64-bit ample of the internal timer taken when CQE is generated. |
| QPN | QP number that generated this CQE |
| Wqe Counter | wqe_counter of the WQE completed. |
| Owner Indication | CQE ownership indication - altered every time CQ number wraps around. |

The above list is presented by way of example of the types of data provided by a NIC with strong Ethernet protocol-offload capabilities. Certain of the fields in the table may be omitted, and other fields may be added, depending on the network type (such as Ethernet or InfiniBand) and capabilities of the NIC.

CQEs with Reduced Data Size

FIGS. 2A-2D are block diagrams that schematically illustrate schemes for reduction of the data size of CQEs generated by NIC 38, in accordance with a number of embodiments of the present invention. Some of these embodiments are also useful in reducing the number of transactions required on bus 36 to convey these CQEs to memory 34.

In the scheme of FIG. 2A, an initial CQE (referred to as a header CQE or a Title CQE 60—The terms "header" and "title" are used interchangeably herein) in a succession of CQEs directed by NIC 38 to a given CQ 56 contains the full complement of completion information, such as the information presented above in Table I. In subsequent CQEs, however, much of the completion information may simply duplicate that in header CQE 60. Therefore, rather than sending these subsequent CQEs at full size, NIC 56 transmits incremental CQEs 62, containing the fields of completion information that have changed since the previous CQE in the succession. Repeated information, such as packet header fields and QPN, is omitted from the incremental CQEs.

Thus, for example, assuming all packets transmitted or received on a given QP have the same source and destination information (referred to in Ethernet parlance as a "five-tuple"), incremental CQEs 62 need contain only the ETACK information and byte count fields, as listed in the table above. In this case, the size of the incremental CQEs may be reduced to less than eight bytes. Alternatively, when five-tuple information varies within the same QP or CQ, the size of the incremental CQEs may be greater.

As client 46 reads incremental CQEs 62, it reconstructs the complete CQE information as needed on the basis of information extracted previously from header CQE 60 and stored by client 46. When the NIC sends a new header CQE (for example, to report completion of a new succession of WQEs, with different contents), the stored information is reset and refreshed.

CQEs 60 and 62 may be stored briefly in CQE cache 58 and then concatenated into a single "coalesced CQE" 64 for transmission over bus 36, as illustrated in FIG. 2B. For efficient use of bus and memory resources, it is desirable that the size of coalesced CQE 64 be an integer multiple of the cache line size (for example 64 or 128 bytes). The more CQEs 62 that can be coalesced in this manner, the greater will be the savings in terms of bus bandwidth, though at the cost of greater latency in CQE delivery to clients 46.

FIG. 2C schematically illustrates a scheme in which NIC 38 generates reduced CQEs 66, i.e., CQEs from which certain data fields have been removed, relative to the full CQE format (such as that listed above in Table I), in order to reduce the data size of the CQE. Typically, the fields that are removed from CQEs 66 are those that are common to multiple, successive CQEs and that client 46 can derive from other sources. The present scheme differs from that of FIG. 2A in that all reduced CQEs 66 are typically of the same size and contain the same data fields. The client 46 that is to open and interpret CQEs 66 may draw the remaining information from context 50 in memory 34 or possibly from application memory or other sources at the disposal of the client.

Typically, only certain CQs 56 are configured in context 50 to receive reduced CQEs 66, while other CQs receive, by default, the larger full-format CQE. Only certain QP numbers are mapped to these reduced-CQE CQs, and it is the job of the programmer to ensure that clients 46 are allocated QPs (and hence CQs) of the desired type and are able to interpret the CQEs that they receive.

Sequences of reduced CQEs 66 may be concatenated into compressed CQEs 68, as illustrated in FIG. 2D. The motivation for and operation of this scheme are similar to those of the scheme based on coalesced CQEs 64 that is shown in FIG. 2B.

Figure 3A:
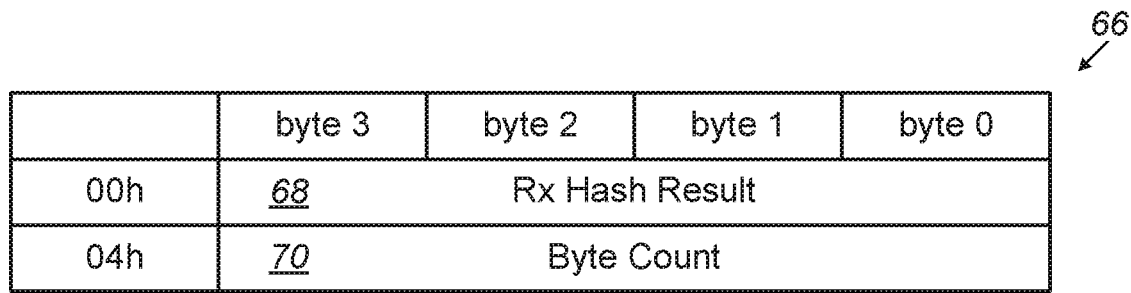
FIGS. 3A-3B are tables that schematically illustrate data structures of two types of reduced CQE, in accordance with embodiments of the present invention.
Figure 3B:
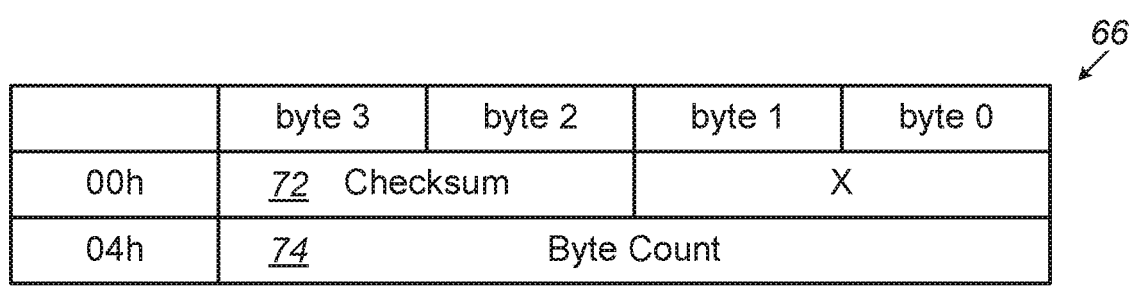

FIGS. 3A-3B are tables that schematically illustrate data structures of two types of reduced CQE 66, in accordance with embodiments of the present invention (embodiments according to the present invention may comprise any or all of the two types, as well as other suitable types). The data fields in this figure are, for the most part, selected from the larger set of fields that are listed above in Table I for reporting completion of Ethernet packet operations. In a first CQE type (FIG. 3A), the CQE comprises a 32-bit Rx-Hash result field 68, and a 32-bit Byte-Count field 70. In a second CQE type (FIG. 3B), the CQE comprises a 16-bit checksum field 72, and a 32-bit Byte-Count field 74. As illustrated in FIGS. 3A-3B, the 64-byte format of the full CQE can be reduced to only 8 bytes by judicious choice of the fields to be included.

The choice of fields to include or exclude is a design decision, which may vary from system to system and from protocol to protocol. Thus, for example, the CQE fields for reporting completion of message transmission and reception over an InfiniBand network will differ from those shown in the present Ethernet example. Moreover, according to some embodiments of the present invention the choice of fields may vary dynamically, between coalescing sessions or even between reduced CQEs that share the same header CQE. The present invention is in no way limited to a particular protocol or CQE-reduction scheme, and those skilled in the art will be able to devise various alternative schemes after reading the present disclosure. All such alternative schemes are considered to be within the scope of the present invention.

To mitigate latency that may be incurred when CQEs are waiting to be coalesced and sent, NIC 38 may maintain one or more timers and may send the contents of pending CQEs when a timer elapses (as will be explained below, with reference to FIGS. 6 and 7), without waiting for the next, new CQE Although the use of merged CQEs that is described above with particular reference to the reduced CQE format of FIG. 3, CQEs of substantially any type and format may be merged in this fashion. Such a merger of CQEs is advantageous in reducing the data volume consumed in memory 34 and the bandwidth used on bus 36. Thus, for example, successive incremental CQEs 62 may be merged, subject to proper choice of the fields to be masked when comparing successive CQEs.

In latency-sensitive applications, the mechanisms described above for combined transmission of multiple CQEs, as well as the use of timers, can have a deleterious effect on application performance. To avoid this sort of performance penalty, NIC 38 may be configured to combine CQEs only when necessitated by system conditions, such as when bus 36 is congested. For example, if bus 36 comprises a PCIe bus, the NIC can detect bus congestion by monitoring flow control credits on the bus, and can send all CQEs immediately when the bus is uncongested or combine CQEs and thus conserve bus bandwidth when congestion is detected. Similarly, even when mechanisms of combined transmission of CQEs are in use, NIC 38 may flush cache 58 (i.e.—send all pending CQEs) whenever congestion is low.

Additionally or alternatively, as described below, NIC 38 may transmit the first CQE (or CQEs) in a given cache line immediately, and combine subsequent CQEs in the same line.

Figure 4:
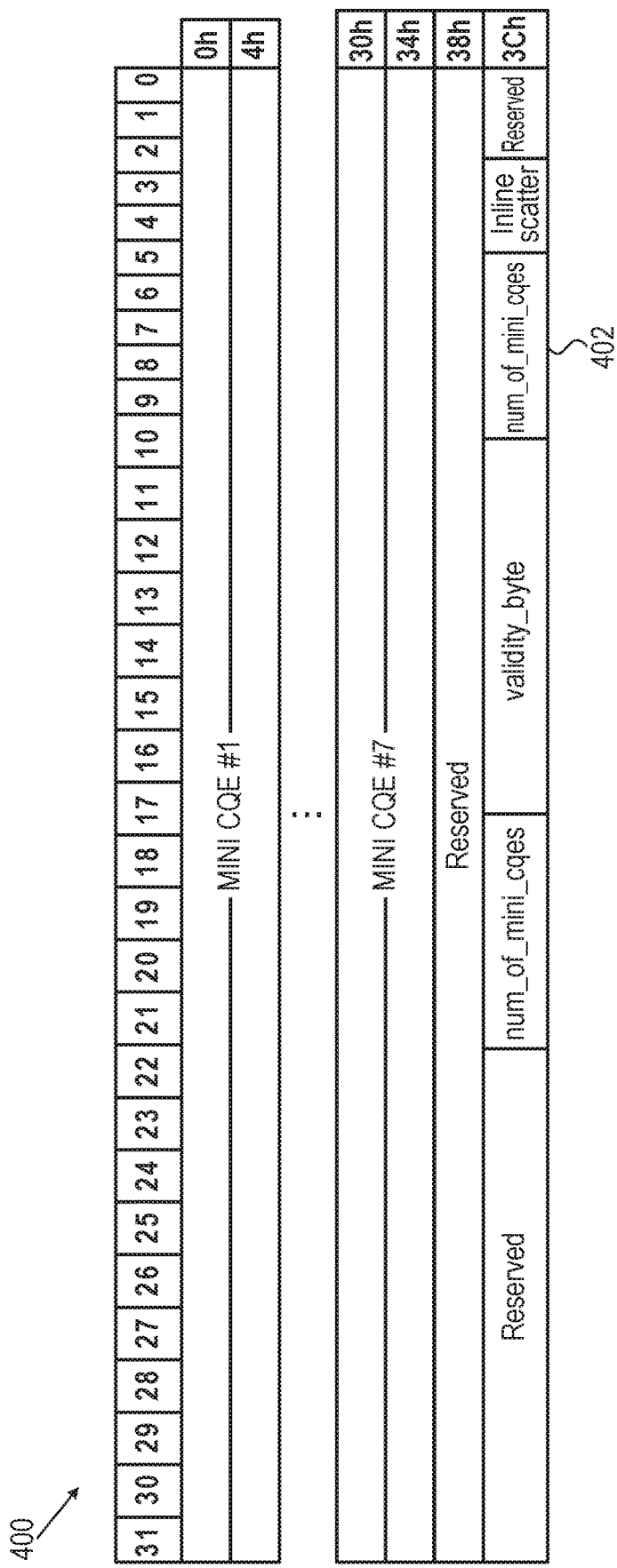
FIG. 4 is a table that schematically illustrates a Mini-CQEs Group (MCG), in accordance with an embodiment of the present invention.

FIG. 4 is a table 400 that schematically illustrates a Mini-CQEs Group (MCG), in accordance with an embodiment of the present invention. Each Mini-CQE comprises 8 bytes. Up to 7 Mini-CQEs may be coalesced in a single MCG. In addition, the MCG comprises attribute and information fields, including a Mini-CQE format, a Validity-Indicator field, a field that defines the number of Mini-CQEs in the MCG (which may comprise any number from 1 to 7), and an in-line scatter field (in the example embodiment of FIG. 4, the in-line scatter field must assume a binary value of 11. The field name is derived from other applications.)

The last 64 bytes of the MCG are similar in structure to corresponding fields of a non-coalesced CQE:

TABLE II

ATTRIBUTE AND INFOMRATION FIELDS, IN AN MCG AND IN A CQE

| MCG field | CQE field |
|---|---|
| inline_scatter | inline_scatter |
| num_of_mini_cqes | opcode |
| Validity-Indicator | signature |
| mini_cqe_format | wqe_counter |

Thus, according to the example embodiment illustrated in FIG. 4, up to 7 CQEs fit in a single MCG. The coalesced CQEs occupy the same size that a non-reduced CQE does, saving space and bus transactions. The additional fields of the MCG allow the client to reconstruct the coalesced CQEs.

As would be appreciated, the structure of MCG 400 described above is cited by way of example. MCGs in accordance with the disclosed techniques are not limited to the description hereinabove. In alternative embodiments the MCG may comprise, for example, a different number of Mini-CQEs, and/or a different set of attribute and information fields. In some embodiments of the present invention, the MCG may comprise error detection and/or error correction bits.

Figure 5:
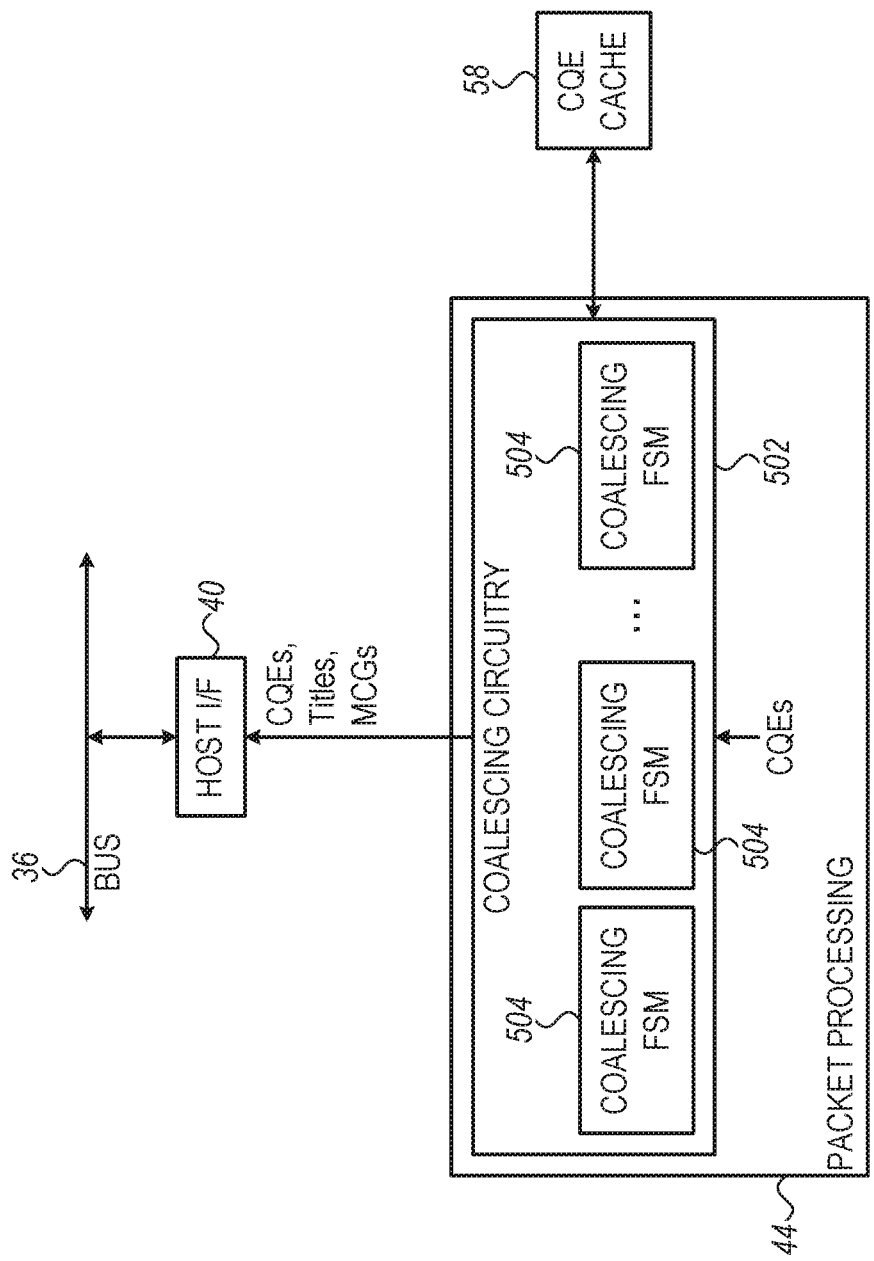
FIG. 5 is a block diagram that schematically illustrates the structure of Coalescing Circuitry, in accordance with an embodiment of the present invention.

FIG. 5 is a block diagram that schematically illustrates the structure of a coalescing circuitry 502, in accordance with an embodiment of the present invention. The coalescing circuitry is embedded in Packet Processing 44 (FIG. 1), and coupled to a CQE Cache 58, which is used for temporary storage of Mini-CQEs and Titles.

Coalescing Circuitry 502 receives completion reports from packet processing 44. The Coalescing Circuitry comprises at least one Coalescing Finite State-Machine (Coalescing FSM) 504, wherein each Coalescing FSM may generate Titles and Mini-CQEs, temporarily stores the Mini-CQEs in CQE Cache 58, coalesces Mini-CQEs to MCGs, and send CQEs, Titles and MCGs through Host Interface 40 and Bus 36, to the clients. (Typically, each Coalescing FSM will serve a separate client, through a separate CQ.)

As described above, the size of the data sent by Coalescing Circuitry 502 to the clients is smaller than the corresponding size of the CQEs that the Coalescing Circuitry receives, and, hence, loading of Bus 36 is reduced, improving the performance of both the peripheral device and Host 22 (FIG. 1).

As would be appreciated, the structure and connections of Coalescing Circuitry 502 described above are cited by way of example. Coalescing in accordance to the disclosed techniques is not limited to the description hereinabove. In alternative embodiments, for example, coalescing may be done by software or microcode, and some or all the separate Coalescing FSMs 504 may be merged to logic units that are configured to coalesce CQEs pertaining to more than one CQ.

Figure 6:
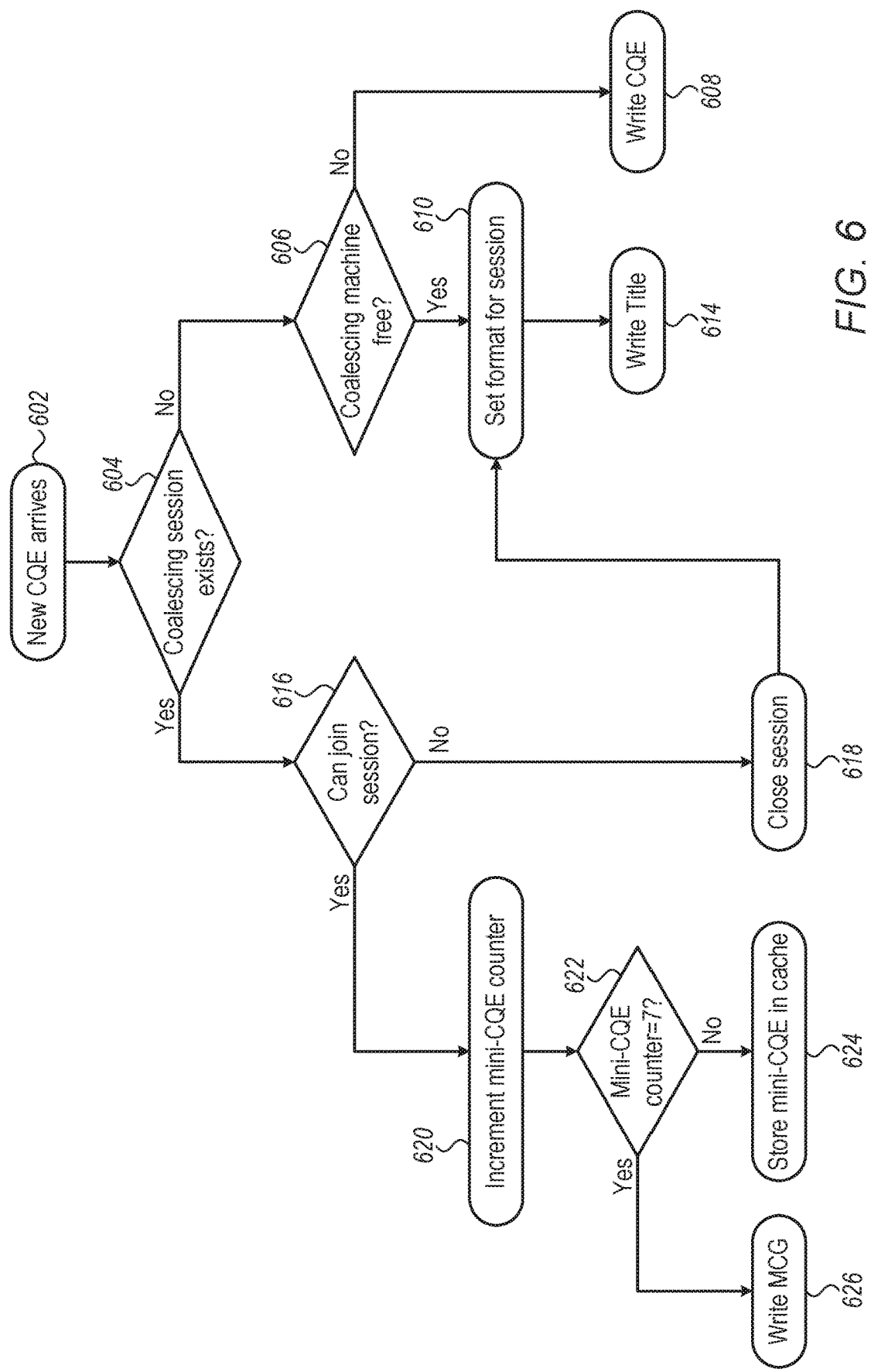
FIG. 6 is a flow chart that schematically illustrates a method for CQEs coalescing, in accordance with an embodiment of the present invention.

FIG. 6 is a flow chart 600 that schematically illustrates a method for CQEs coalescing, in accordance with an embodiment of the present invention. The flow chart is executed by Coalescing Circuitry 502 (FIG. 5).

The flow starts at a Receiving New CQE step 602, wherein the Coalescing Circuitry receives a new CQE from Packet Processing 44. The Coalescing Circuitry next enters a Checking-if-Session Exists step 604, wherein the Coalescing Circuitry checks if a Coalescing Session exits for the present client.

If, in step 604, a Coalescing Session does not exist, the Coalescing Circuitry will enter a Checking-FSM-Availability step 606, wherein the Coalescing Circuitry checks if any of Coalescing FSMs 504 (FIG. 5) is free. In case no coalescing FSM is free, the Coalescing Circuitry will enter a Writing CQE step 608, write a non-reduced CQE to the CQ (that corresponds to the current client), and end the flowchart.

If, in step 606, one or more free Coalescing FSMs are found, a new Coalescing FSM will be allocated and a new Coalescing Session will start. The Coalescing Circuitry will enter a Setting Session Format step 610, prepare a Title CQE, and, in a Writing Title step 614, write the Title to the CQ (that corresponds to the present client), and end the flow-chart.

If, in step 604, a Coalescing Session exists for the current client, the Coalescing Circuitry will enter a Join-Session-Check step 616, wherein the Coalescing Circuitry will check if the current CQE can be reduced based on the current Title (that is—if the current CQE is close enough to the Title CQE of the current session). If the current CQE cannot be reduced based on the current Title, the Coalescing Circuitry will, in a Closing Session step 618, close the current Coalescing Session, and then enter Setting Session Format step 610, and start a new Coalescing Session.

If, in step 616, the current CQE can be added to the Coalescing Session, the Coalescing Circuitry will enter an Incrementing Mini-CQE-Counter step 620, wherein the Coalescing Circuitry will increment a counter that counts the number of Mini-CQEs in the current MCG, and enter a Checking-Mini-CQE-Counter-Done step 622.

If, in step 622, the Mini-CQE counter value has not reached 7 (the maximum number of Mini-CQEs in a MCG in this example embodiment), the Coalescing Circuitry will enter a Storing-Mini-CQE step 624, wherein the Coalescing Circuitry reduces the current CQE to a Mini-CQE (by eliminating fields that are identical to corresponding fields in the Title), store the Mini-CQE in CQE Cache 58 (FIG. 1), and exit the flow. If, in step 622, the Mini-CQE counter has reach the final value of 7, the Coalescing Circuitry will enter a Writing MCG step 626, wherein the Coalescing Circuitry will generate an MCG by reducing the current CQE to a Mini-CQE, concatenating the Mini-CQE with all pending Mini-CQEs (that are stored in CQE cache 58), and adding attribute and information fields (see Table II above). The Coalescing Circuitry will then write the MCG to the CQ (that corresponds to the current client), and then exit the flow.

It should be noted that, for simplicity, FIG. 6 does not illustrate termination of a session due to events such as time-out, as will be explained hereinbelow.

Thus, according to the example embodiment described above with reference to FIG. 6, a Coalescing Circuitry may be able to sequentially receive CQEs, add the CQEs to existing Coalescing Sessions or open new Coalescing Session if no suitable session is found, reduce CQEs to Mini-CQEs, assemble groups of Mini-CQEs to MCGs, and write Titles, CQEs or MCGs into corresponding completion queues, through the NIC and through a suitable bus.

As would be appreciated, the method for CQEs coalescing as illustrated in flow-chart 600 and described above is cited by way of example. CQE coalescing methods in accordance with the disclosed techniques are not limited to the description hereinabove. In alternative embodiments, for example, the flow chart or parts thereof can be executed in parallel rather than sequentially; the number of coalesced CQEs in an MCG can be any number other than 7; a session may be terminated for reasons other than the counter reaching a preset value. In some embodiments, more than one title can be used in the same coalescing session.

Timers

According to embodiments of the present invention, the long latency time which may occur if the Coalescing Circuitry waits for CQEs may be mitigated by timers in the Coalescing Circuitry, which can force writing of CQEs and MCGs into the CQ. Typically, one or more timers are used for each Coalescing Session, and when several Coalescing Sessions are concurrently active, several timers may be needed.

Two example timers are disclosed hereinbelow—an MCG counter and an Any-Write counter. Embodiments of the present invention, however, may comprise any other timer or timers, to enforce writing CQ entries.

Figure 7:
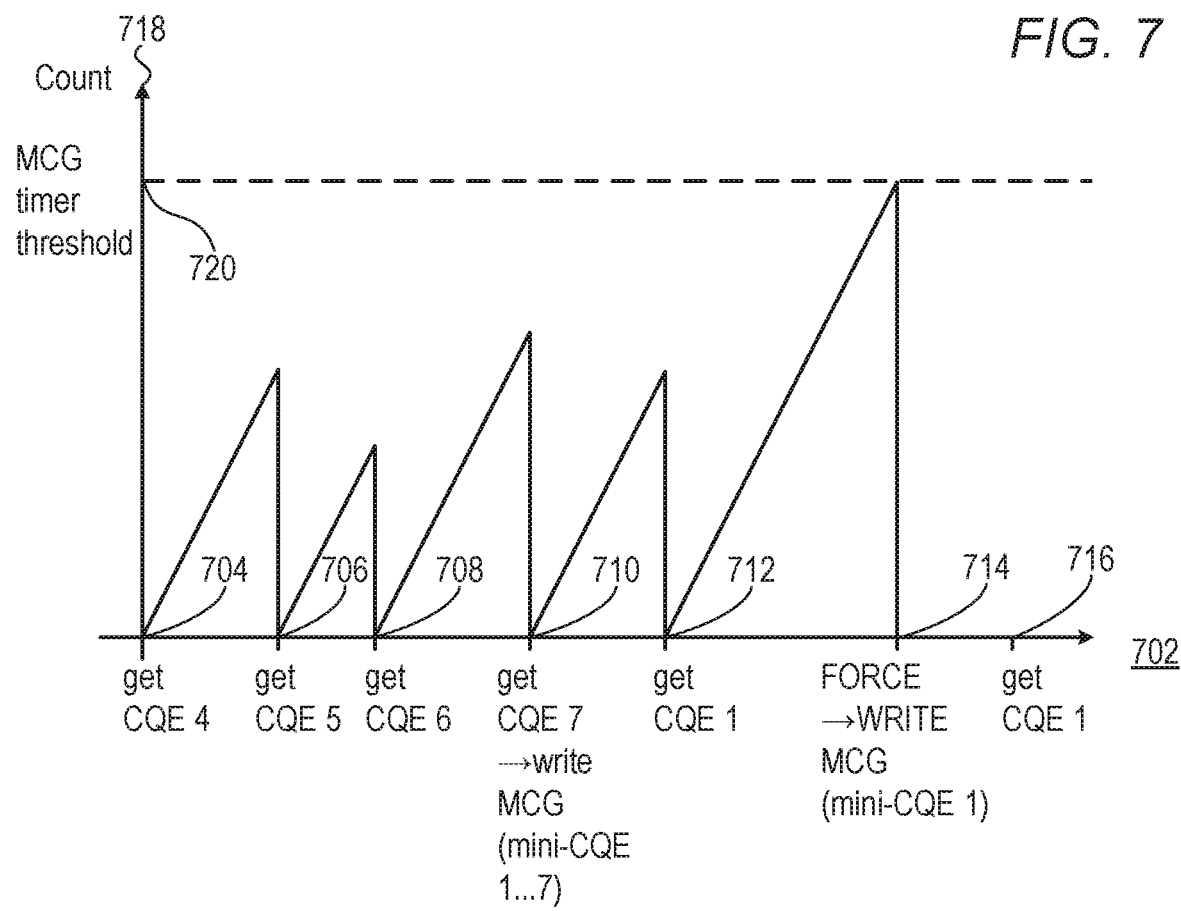
FIG. 7 is a timing chart that schematically illustrates the operation of an MCG timer, in accordance with an embodiment of the present invention.

FIG. 7 is a timing chart 700 that schematically illustrates the operation of an MCG timer, in accordance with an embodiment of the present invention. The purpose of the MCG timer is to assure that if a Coalescing Session is active and waits for CQEs, and, a next CQE is delayed (for example, due to CPU cache miss), the increased latency evidenced by the client will be limited.

The timing chart illustrates coalescing events that take place along a time axis 702. The events are drawn to scale, and longer horizontal distances indicate longer time periods. It is assumed that when the time axis starts, a Coalescing Session is already active, with 3 pending CQEs. At time points 704, 706 708 and 710, the Coalescing Circuitry receives additional CQEs that can be merged into the Coalescing Session—designated CQE 4 to CQE 7, respectively.

At a time point 710, when the seventh CQE is received, the Coalescing Circuitry builds an MCG from the seven CQEs and writes the MCG (through the NIC and the bus) in the CQ.

At a time point 712 the coalescing circuitry receives another CQE that fits the current Title; however, the next CQE is delayed. Consequently, a forced write-MCG event takes place at a time point 714, wherein the Coalescing Circuitry builds a single-Mini-CQE MCG and writes it in the CQ. The next CQE to arrive, at a time point 716, will be the first CQE of the next MCG.

A vertical axis 718 designates the value of a counter-timer. An horizontal line 720 designates a time-out threshold (that can be pre-programmed or dynamically adjusted). the timer-counter is reset when a CQE is received and when an MCG (or a Title, or a non-reduced CQE) is written in the CQ. At any other time, if the Coalescing Session is active, the timer-counter increments, as indicated by the diagonal lines.

At time points 706, 708, 710 and 712, the timer-counter value is less than threshold 720. However, at time point 714, due to the large distance between time-point 712 and time-point 716, the timer-counters reaches the threshold value, and, consequently, the Coalescing Circuitry sends an MCG with the pending CQEs only (a single CQE in the example embodiment of FIG. 7.) The timer-counter is then reset.

Thus, according to the example embodiment of FIG. 7, the long latency for the handling of previous CQEs which may occur if a next CQE is delayed, can be controlled by properly setting threshold 720. It should be noted that the setting of threshold 720 is a tradeoff between performance and latency time, as low thresholds may result in more writes into the CQ.

Figure 8:
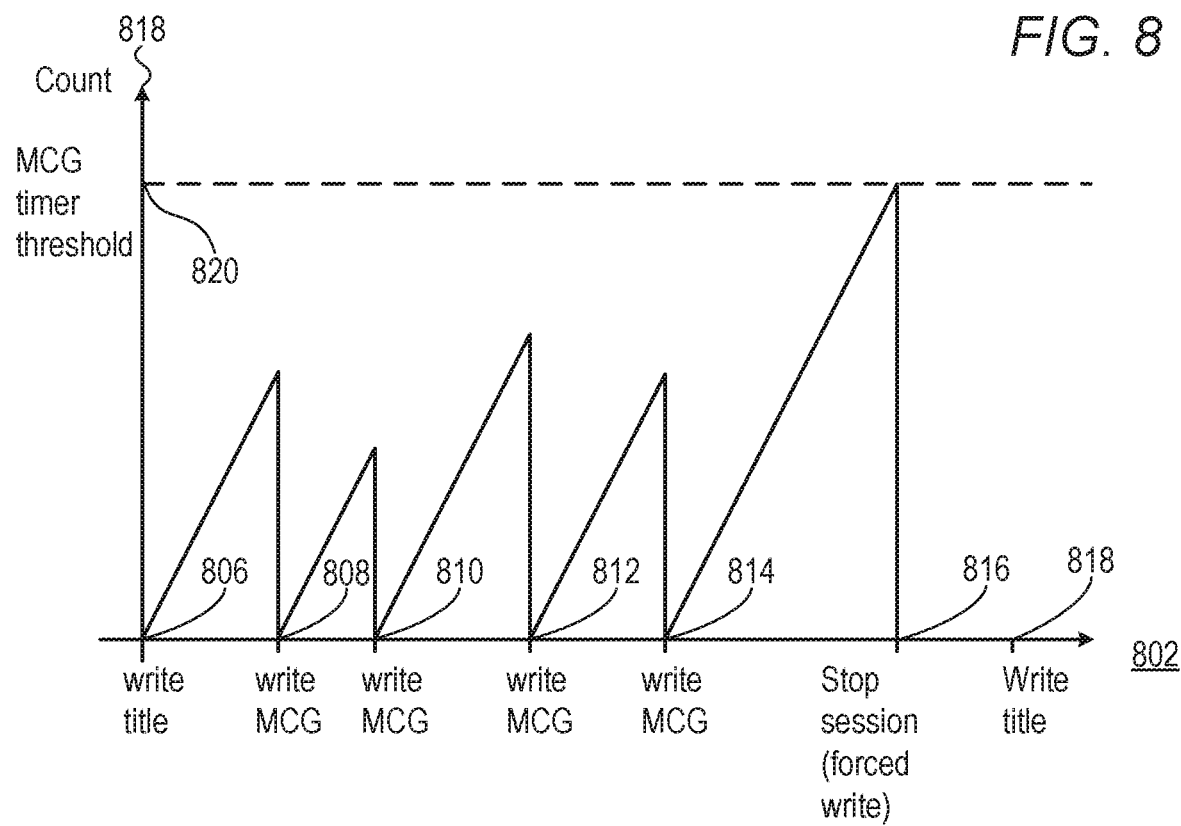
FIG. 8 is a timing chart that schematically illustrates the operation of an Any-Write timer, in accordance with an embodiment of the present invention.

FIG. 8 is a timing chart 800 that schematically illustrates the operation of an Any-Write timer, in accordance with an embodiment of the present invention. Like FIG. 7, FIG. 8 comprises an horizontal time-axis 802 and a vertical timer-counter value axis 804. The events along the time axis, though, pertain to writes into the CQ, and whenever the Coalescing Circuitry writes anything to the CQ (a Title, an MCG or a non-reduced CQE) the timer-counter resets to zero.

In the example embodiment, the Coalescing Circuitry writes a Title at a time point 806, followed by MCGs at time points 808, 810, 812, and 814. The time intervals between subsequent time points up to time-point 814 is relatively low, and no forced-writes take place. However, the next write after time-point 814 is delayed. As a result, at a time-point 816, the Coalescing Circuitry sends the pending MCG and stops the Coalescing Session. Next, at a time-point 818, when the Coalescing Circuitry receives another CQE, the Coalescing Circuitry writes a new Title in the CQ.

An horizontal line 820 designates a time-out threshold (that can be pre-programmed or dynamically adjusted). In the example of FIG. 8, the timer counter does not reach the threshold at time points 808, 810, 812 and 814. However, as the time period from time point 814 to time point 818 is relatively long, the timer counter reaches the threshold, and, consequently, the Coalescing Circuitry terminates the Coalescing Session.

In some embodiments, both an MCG and an Any-Write timer are simultaneously active. Any CQE may be occasionally delayed, with probability that is function of the delay—p(delay). However, the probability function for the accumulated delay of 7 consecutive CQEs may be (depending on the delay distribution,) $sqrt(7)*p(delay)$. For example, if a programmer sets the threshold value of the MCG timer to 10 micro-seconds, and consecutive CQEs are 9.9 micro-second apart, the MCG timer will not force any CQE write, and the first CQE will be delayed by $7*9.9=69.3$ micro-second. However, if an any-write timer is also used, its threshold could be set to $sqrt(7)*10$ f 26.5 micro-second, and the maximum latency time will be significantly reduced.

As would be appreciated, the characteristics of the timers illustrated in the timing charts of FIGS. 7 and 8 are example charts that are cited by way of example. Timers in accordance to the disclosed techniques are not limited to the description hereinabove. In alternative embodiments, for example, a timer may not be linear. For another example, a timer may have thresholds that dynamically change so as to keep the rate of forced session termination below a pre-defined level.

Validity Indicator

In embodiments according to the present invention, when the Coalescing Circuitry writes a 7-Mini-CQEs MCG to a CQ, it then skips the next 6 entries in the CQ before it writes the next CQ entry. Thus, the CQ may have empty spaces.

As the CQ is typically cyclic, the client software may read empty spaces in the CQ, and mistake them for new entries.

One way to solve this problem is to define an Owner_bit in the CQEs (including Titles, MCGs and non-reduced CQEs), and alternate the bit in consecutive CQ write iterations. For example:

even iteration: owner_bit is marked with 0;
odd iteration: owner_bit is marked with 1.

At the end of each CQ read iteration (when the client software reads the last entry in the CQ buffer), the client software rescans the buffer, and marks all empty spaces with an owner_bit value matching the current iteration, to avoid false indication in future iterations. This approach, however, consumes a significant amount of CPU time, and may degrade the host performance.

Some embodiments according to the present invention implement a Fixed Validity-Indicator technique, wherein the marks that distinguish the present iteration from previous iterations comprise Validity-Indicators that are used instead of the owner_bit. (The Validity-Indicator comprises eight bits; however, embodiments of the present invention are by no way limited to 8-bit validity indicators; any other suitable number of bits may be used).

The Coalescing Circuitry counts the CQ write iterations, and appends the iteration number (modulo 256) to any Title, MCG or non-reduced CQE that the Coalescing Circuitry writes into the CQ. The client software then ignores any CQ entries that do not have a Validity-Indicator equals to the iteration number (more precisely—the client software rereads the entry until the Validity-Indicator equals the iteration number), and has to rescan the buffer and write zero to all Validity-Indicators once every $2^n$ iterations (n is the number of Validity Indicator bits). Thus, the required computing time is significantly reduced.

Other embodiment according to the present invention use a Rotating Validity-Indicator technique, wherein the client software does not ever clear the Validity-Indicators. According to an embodiment, the Coalescing Circuitry writes the Validity-Indicator, in iteration n, at buffer locations that are equal to the iteration number modulo K, wherein K equals 128 (for embodiments wherein a validity indicator comprises VBb bits, $K=0.5*2^{\min(VBb,8)}$, where VBb is the number of bits in the Validity-indicator). In other embodiments the validity indicator the cyclic distance between buffer locations in which the validity byte is written may be higher, and up to $2^{\min(VBb,8)}-1$.

Figure 9:
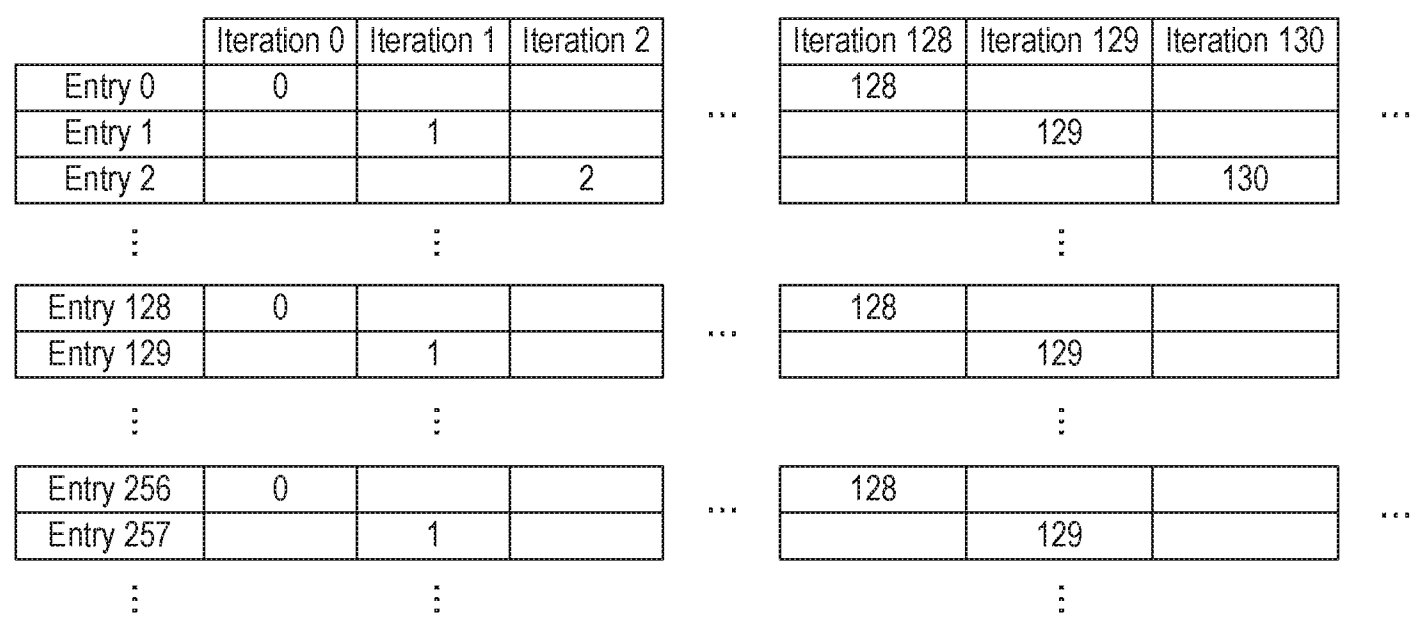

FIG. 9 is a table that schematically illustrates the placement of Validity-Indicators in a completion queue, in accordance with an embodiment of the present invention. In the example embodiment illustrated in FIG. 9, the Validity-Indicator comprises 8 bits. In iteration 0 the Coalescing Circuitry writes 0 in the Validity-Indicators in buffer locations 0, 128, 256, etc.; in iteration 1 the Coalescing Circuitry writes 1 in the Validity-Indicators of buffer locations 1, 129, 257, etc. The client software, when in iteration n, looks for entries with Validity-Indicator equals n. There can be no ambiguity, because in 128 iteration all entries are written (an empty space cannot remain empty for more than 128 iterations).

In some embodiments, the technique described above may sometimes force writing of MCGs that are not full, slightly increasing the bus loading; however, the benefit in decreased client software overhead is typically more significant.

Thus, in the example embodiment of FIG. 9, Validity-Indicator ambiguity is eliminated, and the client software performance is improved, at the cost of a small impact on the bus performance.

As would be appreciated, the table illustrated in FIG. 9, the Fixed and the Rotating Validity-Indicator techniques described above, are cited by way of example. Coalescing Circuitry in accordance to the disclosed techniques are not limited to the description hereinabove. In alternative embodiments, for example, the Validity-Indicator may have a different size (or a size that varies); Rotating and Fixed Validity-Indicator techniques may be used by different clients and/or by the same client, at different periods; In some embodiments, the value that the Coalescing Circuitry writes in the Validity-Indicator is a representation of the iteration number rather than the iteration number.

The configuration of host 22, including CPU 32, Memory 34 and NIC 38; the structures of Reduced CQEs 66 and MCGs 400; the structure of Packet Processing 44 including Coalescing Circuitry 502; Coalescing method 602; the operation of the timers and the location and contents of the Validity-Indicators in the Fixed and the Rotating Validity-Indicator techniques, shown in FIGS. 1 through 9, are example configurations that are shown purely for the sake of conceptual clarity. Any other suitable configurations can be used in alternative embodiments.

The different elements of Coalescing Circuitry 502 (including or excluding the disclosed timers), may be implemented using suitable hardware, such as in one or more Application-Specific Integrated Circuits (ASICs) or Field-Programmable Gate Arrays (FPGAs), using software, using hardware, or using a combination of hardware and software elements.

In some embodiments, host 22 comprises one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computer peripheral device, comprising:
a host interface, which is configured to communicate over a bus with a host processor and with a system memory of the host processor; and
processing circuitry, which is configured to receive and execute work items submitted to the computer peripheral device by client processes running on the host processor, and responsively to completing execution of the work items, to generate, to the system memory, completion reports having fields, including:
identifying in a plurality of the completion reports one or more fields whose corresponding values are identical; and
sending to the system memory a full completion report that comprises the identified fields, and, after sending the full completion report, sending to the system, memory reduced completion reports from which the identified fields are omitted.

2. The device according to claim 1, wherein the processing circuitry is configured to mark the full completion report with an indication that distinguishes between the full completion report and the reduced completion reports.

3. The device according to claim 1, wherein the processing circuitry is configured to mark the reduced completion reports with indications that distinguish between the full completion report and the reduced completion reports.

4. The device according to claim 1, wherein the processing circuitry is configured to identify, in the plurality of the completion reports, first and second different sets of the values, to create respective first and second full reports that comprise the first and second sets of the values, and to concurrently accumulate first reduced completion reports for sending with the first full completion report, and second reduced completion reports for sending with the second full completion report.

5. A computer peripheral device, comprising:
a host interface, which is configured to communicate over a bus with a host processor and with a system memory of the host processor; and
processing circuitry, which is configured to receive and execute work items submitted to the computer peripheral device by client processes running on the host processor, and responsively to completing execution of the work items, to generate, to the system memory, completion reports having fields, including:
accumulating the completion reports for sending to the system, memory over the bus in a common bus transaction; and
stopping accumulation of the completion reports and initiating the common bus transaction in response to (i) a number of the accumulated completion reports reaching a predefined number, or (ii) a preset elapsed-time timer reaches predefined time-out.

6. The device according to claim 5, wherein the elapsed-time timer is initiated on accumulation of a completion report into the common bus transaction.

7. The device according to claim 5, wherein the elapsed-time timer is initiated on sending of a completion report to the system memory.

8. The device according to claim 5, wherein the elapsed-time timer comprises first and second elapsed-time timers operating concurrently, wherein the first elapsed-time timer is initiated on accumulation of a completion report into the common bus transaction, and wherein the second elapsed-time timer is initiated on sending of a completion report to the system memory.

9. A computer peripheral device, comprising:
a host interface, which is configured to communicate over a bus with a host processor and with the computer system memory of the host processor; and
processing circuitry, which is configured to receive and execute work items submitted to the computer peripheral device by client processes running on the host processor, and responsively to completing execution of the work items, to generate, to the system memory, completion reports having fields, including:

reducing sizes of at least some of the sizes to a reduced sizes, respectively;

writing the completion reports having the reduced sizes to the system memory in a cyclic buffer that is overwritten in successive iterations, but assigning in the cyclic buffer the full sizes to the completion reports, thereby retaining in the cyclic buffer one or more completion reports belonging to a previous iteration; and marking the written completion reports with marks that distinguish between a present iteration and the previous iteration.

10. The device according to claim 9, wherein the marks differ in value between the present iteration and the previous iteration.

11. The device according to claim 9, wherein the marks differ in storage location between the present iteration and the previous iteration.

12. A method, comprising:

in a computer peripheral device, communicating over a bus with a host processor and with a system memory of the host processor; and receiving and executing work items submitted to the computer peripheral device by client processes running on the host processor, and responsively to completing execution of the work items, generating, to the system memory, completion reports having fields, including:

identifying in a plurality of the completion reports one or more fields 'whose corresponding-values are identical; and sending to sending to the system memory a full completion report that comprises the identified fields, and, after sending the full completion report, the system memory reduced completion reports from which the identified fields are omitted.

13. A method, comprising:

in a computer peripheral device, communicating over a bus with a host processor and with a system memory of the host processor; and receiving and executing work items submitted to the computer peripheral device by client processes running on the host processor, and responsively to completing execution of the work items, generating, to the system memory, completion reports having fields, including:

accumulating the completion reports for sending to the system memory over the bus in a common bus transaction; and stopping accumulation of the completion reports and initiating the common bus transaction in response to (i) a number of the accumulated completion reports reaching a predefined number, or (ii) a preset elapsed-time timer reaches a predefined time-out.

14. A method, comprising:

in a computer peripheral device, communicating over a bus with a host processor and with a system memory of the host processor; and receiving and executing work items submitted to the computer peripheral device by client processes running on the host processor, and responsively to completing execution of the work items, generating, to the system memory, completion reports having fields, including:

reducing sizes of at least some of the completion reports from full sizes to a reduced sizes, respectively;

writing the completion reports having the reduced sizes to the system memory in a cyclic buffer that is overwritten in successive iterations, but assigning in the cyclic buffer the full sizes to the completion reports, thereby retaining in the cyclic buffer one or more completion reports belonging to a previous iteration; and marking the written compilation reports with marks that distinguish between a present iteration and the previous iteration.

* * * * *